United States Patent [19]
Nakade et al.

[11] Patent Number: 5,516,128
[45] Date of Patent: May 14, 1996

[54] TRUCK WITH HAND-OPERATABLE WHEELS

[75] Inventors: Kenichi Nakade; Hitoshi Okuda; Hisao Ikemoto; Kiyoji Tanda, all of Osaka, Japan

[73] Assignee: Okudaya Giken Co., Osaka, Japan

[21] Appl. No.: 249,382

[22] Filed: May 25, 1994

[30] Foreign Application Priority Data

Jun. 11, 1993 [JP] Japan .................................. 5-166488

[51] Int. Cl.⁶ ...................................................... B66F 19/00
[52] U.S. Cl. ................................ 280/43.12; 280/43.17; 414/495
[58] Field of Search ........................... 280/43.12, 43.17, 280/47.2; 414/495

[56] References Cited

U.S. PATENT DOCUMENTS

| | | | |
|---|---|---|---|
| 2,727,752 | 12/1955 | Gold | 280/43.12 |
| 2,993,703 | 7/1961 | Pardise | 280/43.12 |
| 3,352,569 | 11/1967 | Goodacre | 280/43.12 |
| 3,544,127 | 12/1970 | Dobson | 280/43.17 |
| 3,576,333 | 4/1971 | Danielson et al. | 280/43.12 |
| 3,814,456 | 6/1974 | Bryntse | 280/43.12 |

FOREIGN PATENT DOCUMENTS

58-23740  2/1983  Japan .

*Primary Examiner*—Margaret A. Focarino
*Assistant Examiner*—Michael Mar
*Attorney, Agent, or Firm*—Fisher, Christen & Sabol

[57] ABSTRACT

A truck which has first wheels that are fixed to the front part of a bed with arms put in between so freely as to move up and down and designed to roll backward and forward in the longitudinal direction when in touch with the ground, second wheels that are fixed to the arms with bearing arms put in between so freely as to move up and down and designed to roll right and left in the lateral direction when in touch with the ground, and a rear wheel that is fixed to the bed with a hydraulic pressure cylinder put in between and capable of changing its direction by the turning of a pumping handle which works the cylinder. An arm of which one end is rotatably joined to the bed with a fulcrum link put in between is provided to the inside of the bed and joined to one end of a swiveling arm of which the other end is rotatably joined to one of the arms in order that the first wheels can be raised up from the ground by the movement of the arm in association with the rising movement of the bearing arms coupled with the movement of the arms to lower the second wheels down on the ground.

6 Claims, 10 Drawing Sheets

TRUCK WITH HAND-OPERATABLE WHEELS

BACKGROUND OF THE INVENTION

1. Field of the Invention

The invention relates to a truck which has front wheels provided under the front part of a forked bed and a rear wheel provided under a hydraulic pressure cylinder for raising or lowering the bed.

2. Background Art

As disclosed in Japanese Utility Model Application Publication No. 58-23740, a truck that can be moved backward and forward in the longitudinal direction by a pair of wheels or right and left in the lateral direction by another pair of wheels, both of the pairs of which are rotatably fixed under a the front part of the bed of the truck with arms put in between, and is provided with a rear wheel which is fixed under a hydraulic pressure cylinder and capable of turning to the right and the left with a pumping handle which also works the hydraulic pressure cylinder has been known prior to the present invention.

In the prior art, the paired wheels of the truck which roll in the lateral direction are raised up from the ground by the force of a spring connecting the bed and the arms when the other paired wheels come in touch with the ground. However, the spring is put in so narrow a space between the side of the bed and the arms that its size and length have to be limited. Briefly, a stronger spring with greater diameter and greater number of turns is in fact needed but cannot be used in such a conventional truck due to the narrow space. Since the spring has to be smaller and weaker than it should be, it cannot bear long hard works and sometimes is liable to break down by oxidation corrosion. Therefore, more than one spring is actually needed to raise the wheels and, accordingly, there are problems in safety as well as in its structure.

BROAD DESCRIPTION OF THE INVENTION

In contrast to the above-mentioned conventional truck, however, a truck of the present invention, which has wheels that are fixed to the front part of a bed with arms put in between so freely as to move up and down and designed to roll backward and forward in the longitudinal direction when in touch with the ground, wheels that are fixed to said arms with bearing arms put in between so freely as to move up and down and designed to roll right and left in the lateral direction when in touch with the ground, and a rear wheel that is fixed to said bed with a hydraulic pressure cylinder put in between and capable of changing its direction by the turning of a pumping handle which works said cylinder, is characterized in that an arm of which one end is rotatably joined to said bed with a fulcrum link put in between is provided to the inside of said bed and joined to one end of a swiveling arm of which the other end is rotatably joined to one of said arms in order that said wheels can be raised up from the ground by the movement of said arm in association with the rising movement of said bearing arms coupled with the movement of said arms to lower said wheels down on the ground. As the truck of the invention is designed in the above-mentioned way, the arm and the swiveling arm can be put even in the narrow space between the side of the bed and the bearing arms and both of the wheels are moved for sure, which should improve the durability of the truck and the safety of workers to operate the truck more widely than before.

BRIEF DESCRIPTION OF THE DRAWINGS

An example of the invention is described below in more detail with reference to the attached drawings, in which.

DETAILED DESCRIPTION OF THE INVENTION

In the figures, numeral (1) denotes a forked bed of the truck on which cargoes (3) are to be loaded and numeral (2) denotes the rear part of the bed. In the front part of the truck, a pair of wheels (4, 4) are held by means of arms (3, 3) and another pair of wheels (5, 5) are also held by means of a pair of arms (3, 3) with bearing arms (30, 30) put in between so that all of these wheels can freely get out downward, provided that the wheels (4, 4) roll backward and forward to move the truck in the longitudinal direction and the wheels (5, 5) roll right and left to move the truck in the lateral direction.

A jack (6) which includes a ram-type hydraulic cylinder (7) is provided to the rear part of the bed for raising or lowering the bed (1). The head of a piston rod (8) put in the cylinder (7) supports the undersurface of the rear part (2) of the bed (1) so that the bed can be raised or lowered by the hydraulic pressure increasing or decreasing in the cylinder. A pair of rear wheels (10, 10) are provided to the lower end of the cylinder by means of shafts (9, 9).

There is a base (11) which is comprised essentially of hydraulic pressure circuits generally around the middle part of the cylinder (7). Behind the cylinder (7) is an upright plunger pump (12) on the base (11) and around the upper part of the cylinder (7) is an oil tank (13). The cylinder (7) and the plunger pump (12) are connected to each other by an outlet valve (not shown here) between them, the plunger pump (12) and the oil tank (13) are connected to each other by an inlet valve (not shown here) between them and cylinder (7) and the oil tank (13) are connected to each other by a pressure-releasing value (not shown here) between them. These valves are provided properly to the appropriate points of the hydraulic pressure circuits in the base (11).

Figure 5:
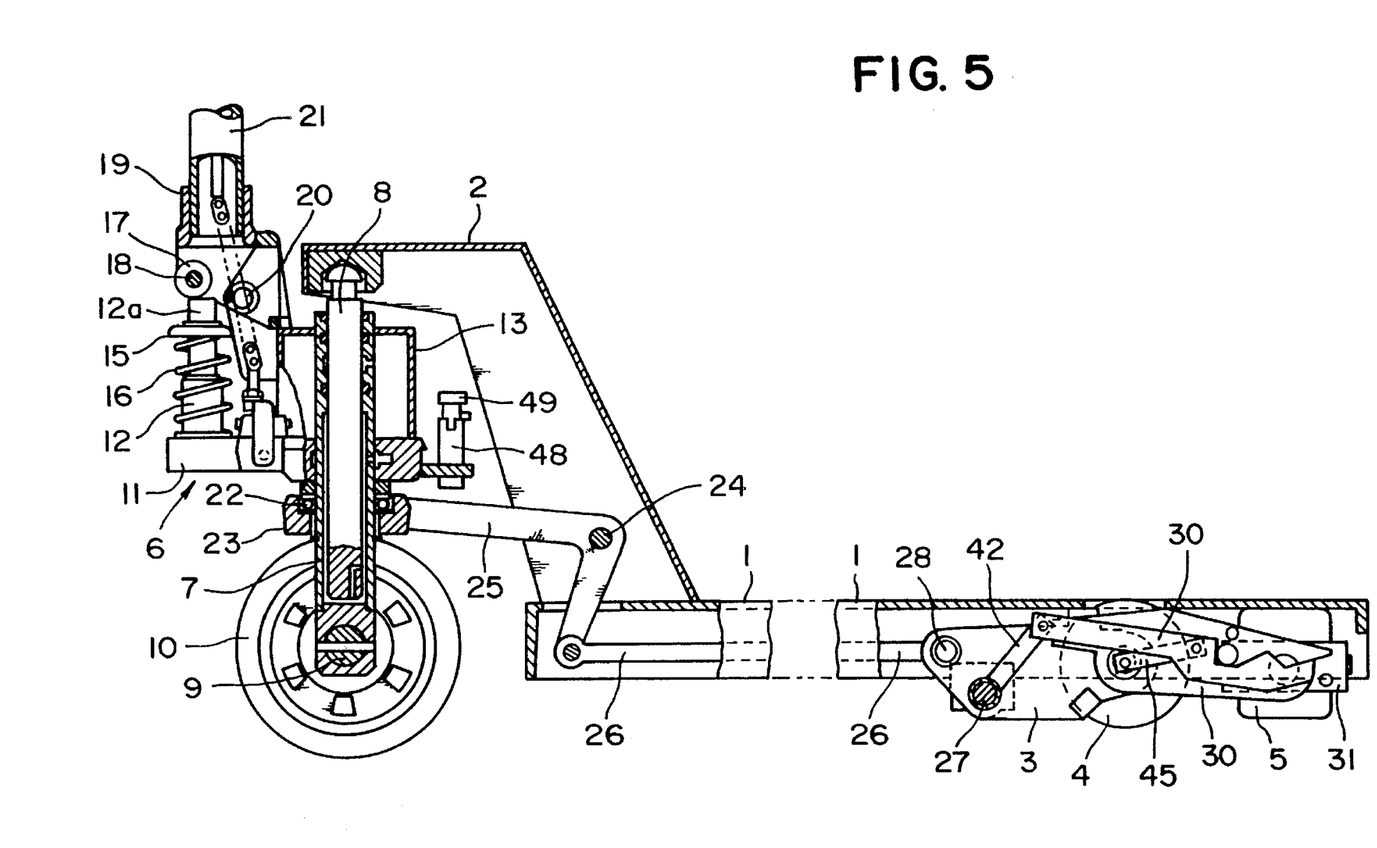
FIG. 5 is a cross-sectional side view of the truck.

As shown in FIG. 5, a ring plate (15) is provided near the upper end (12a) of the plunger piston in order that the piston can keep its highest position by the force of a spring (16) put under the ring plate. A lever (19) the lower end of which is provided with a roll (17) by means of a shaft (18) is located beside the cylinder so that it can be swiveled back and forth around a pivot (20).

The lower end of a T-shaped pumping handle (21) is joined to the upper end of the lever (19). The structure is such that swiveling the pumping handle (21) works the plunger pump (12) and this consequently works the cylinder (7).

A bearing plate (23) is provided to the surrounding of the ram cylinder (7) under the base (11) so that it can freely rotate around the ram cylinder with the help of a bearing (22). One end of the L-shaped arms (25, 25) provided on both sides of the bed (1), of which the bent portion is pivotably fixed to a joint (24) on the rear part (2) of the bed, is joined to the bearing plate (23) and the other end of the arms (25, 25) is joined to one end of the connecting rods (26, 26) of which the other end is joined to the arms (3, 3) of the wheels (4, 4), whereby, when the rear part of the bed is raised by the cylinder's piston (8), the arms (3, 3) are caused to turn so that the wheel (4, 4) gets out from under the bed (1) and raise the bed, with the bed kept in the horizontal position.

Figure 1:
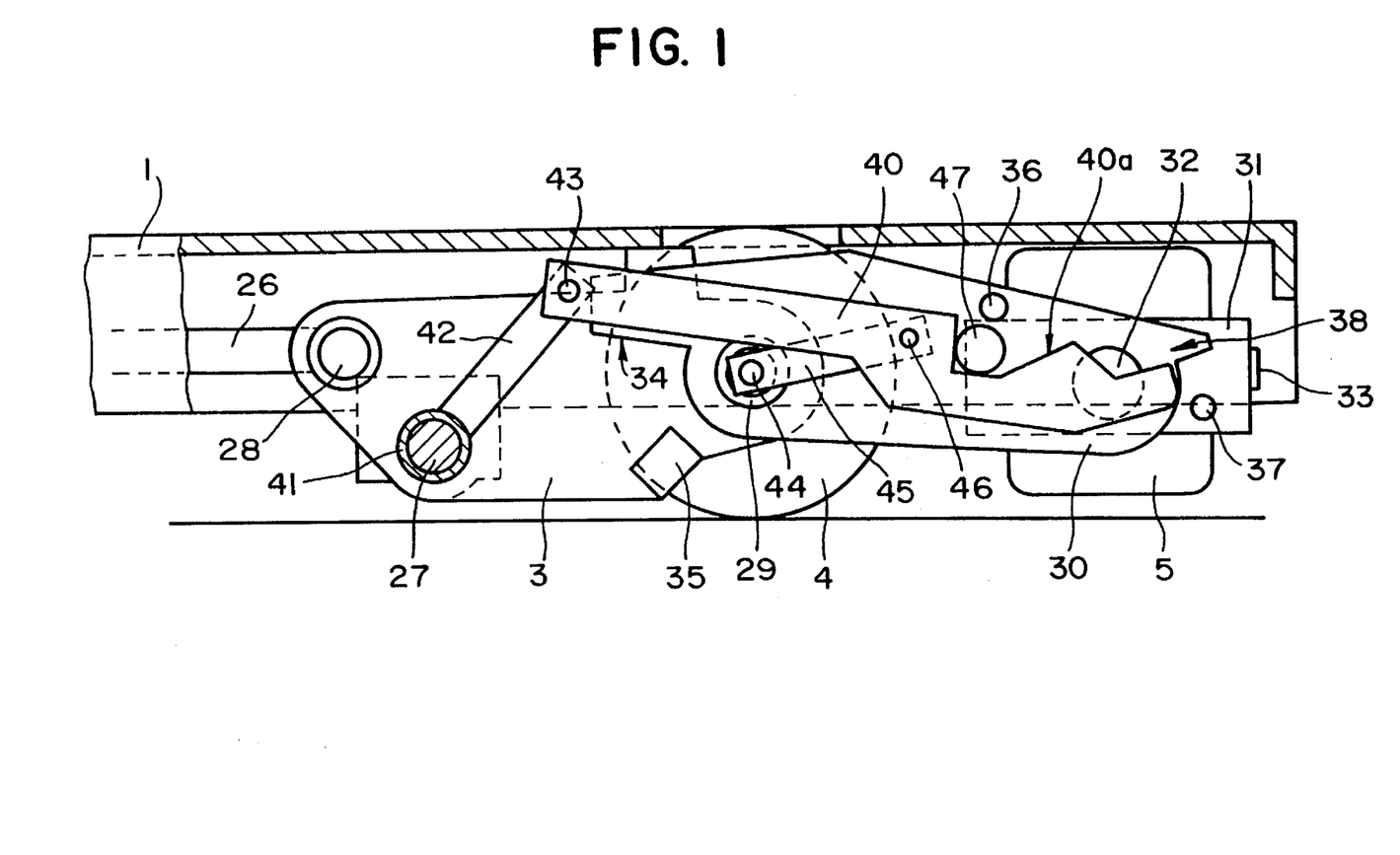
FIG. 1 is a side view of the front part of a truck with hand-operatable wheels of this invention.
Figure 2:
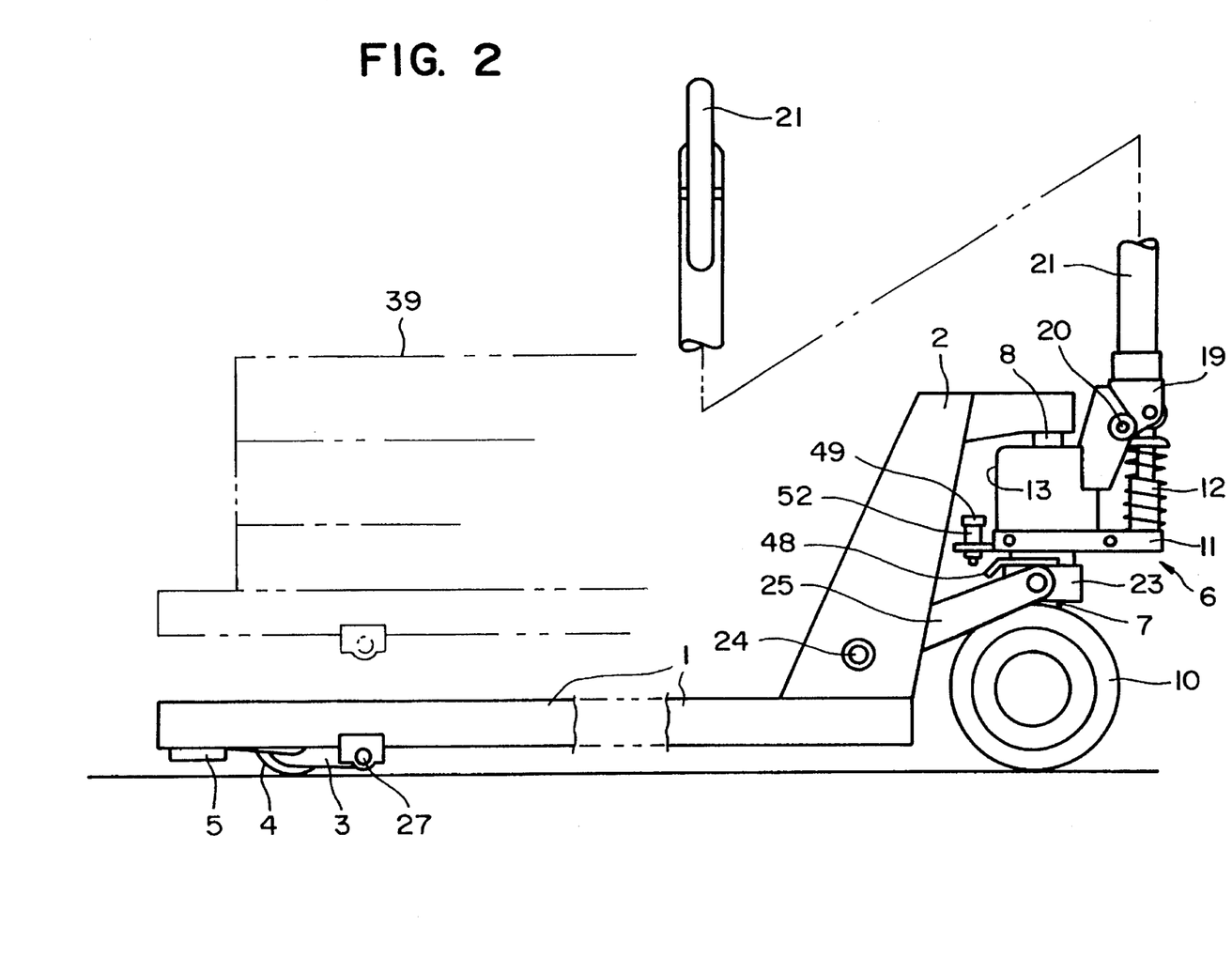
FIG. 2 is a whole side view of the truck.
Figure 3:
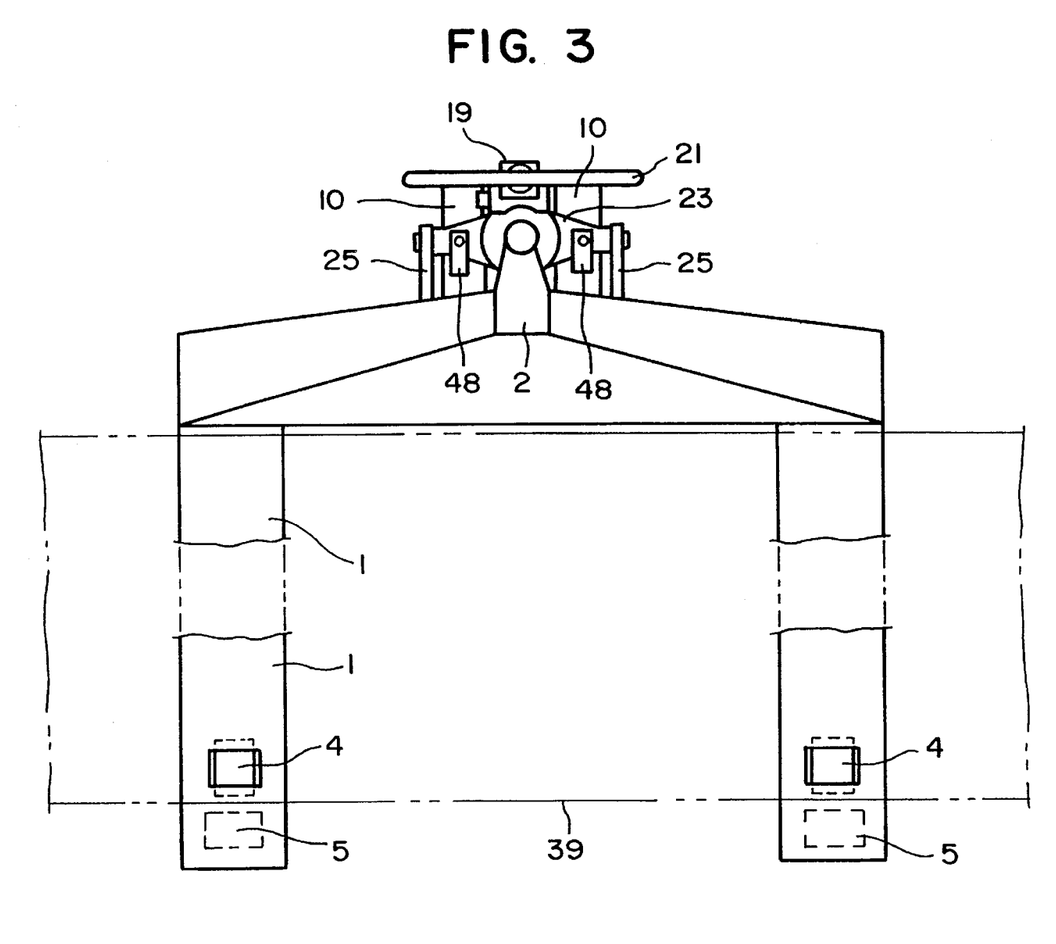
FIG. 3 is a plan of the truck.
Figure 4:
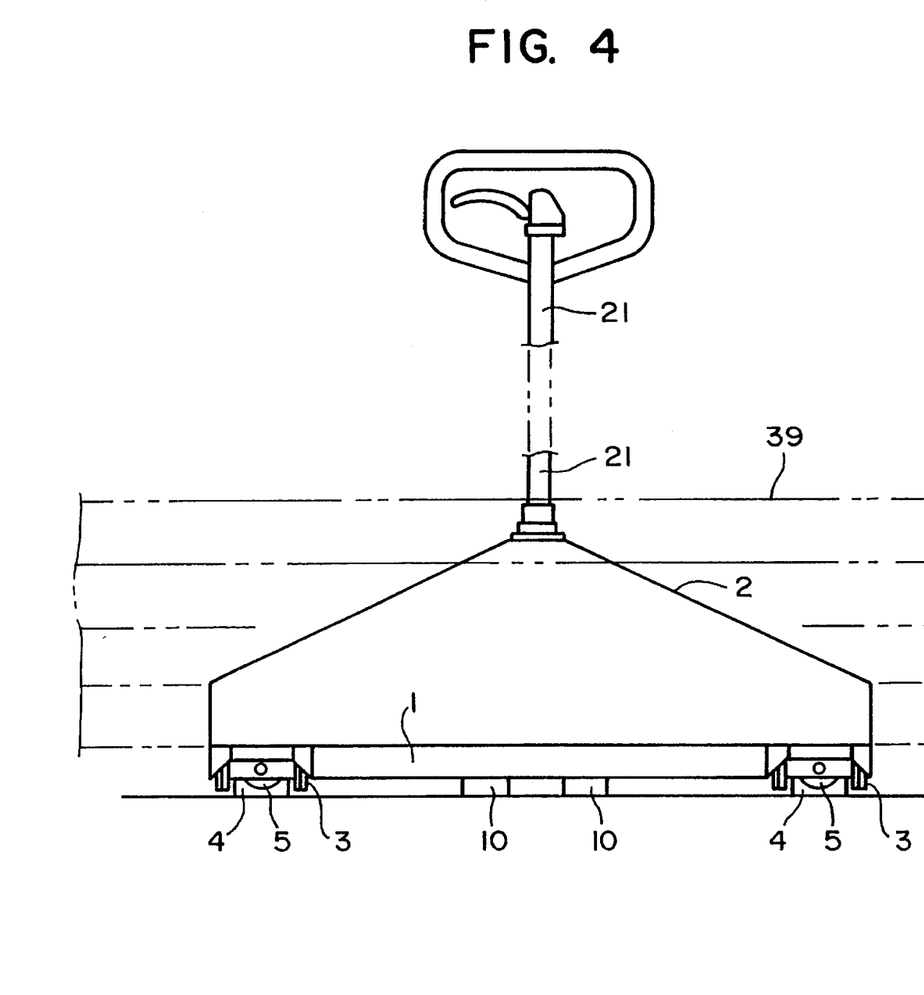
FIG. 4 is an elevation of the truck.
Figure 6:
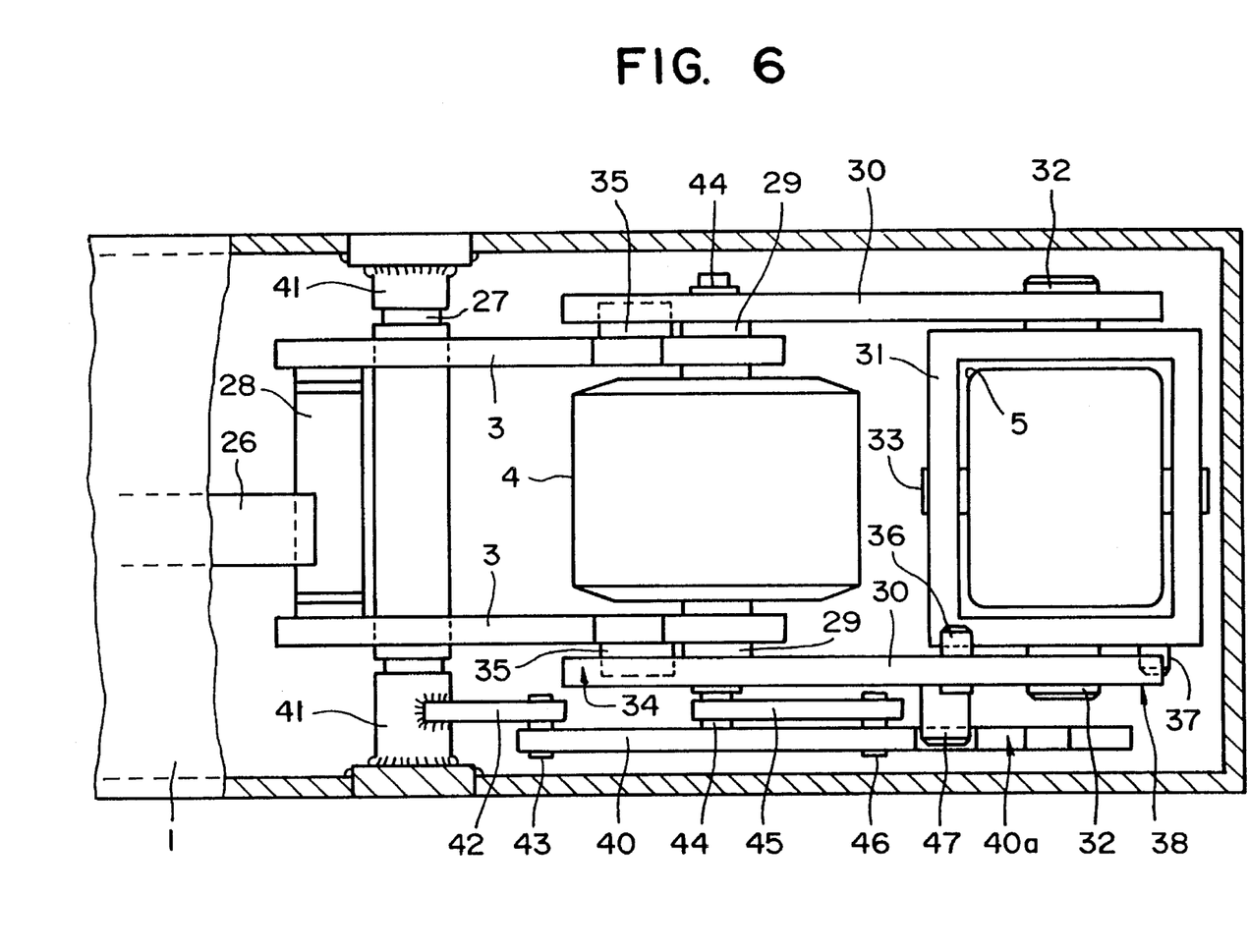
FIG. 6 is a plan of the front part of the bed.
Figure 8:
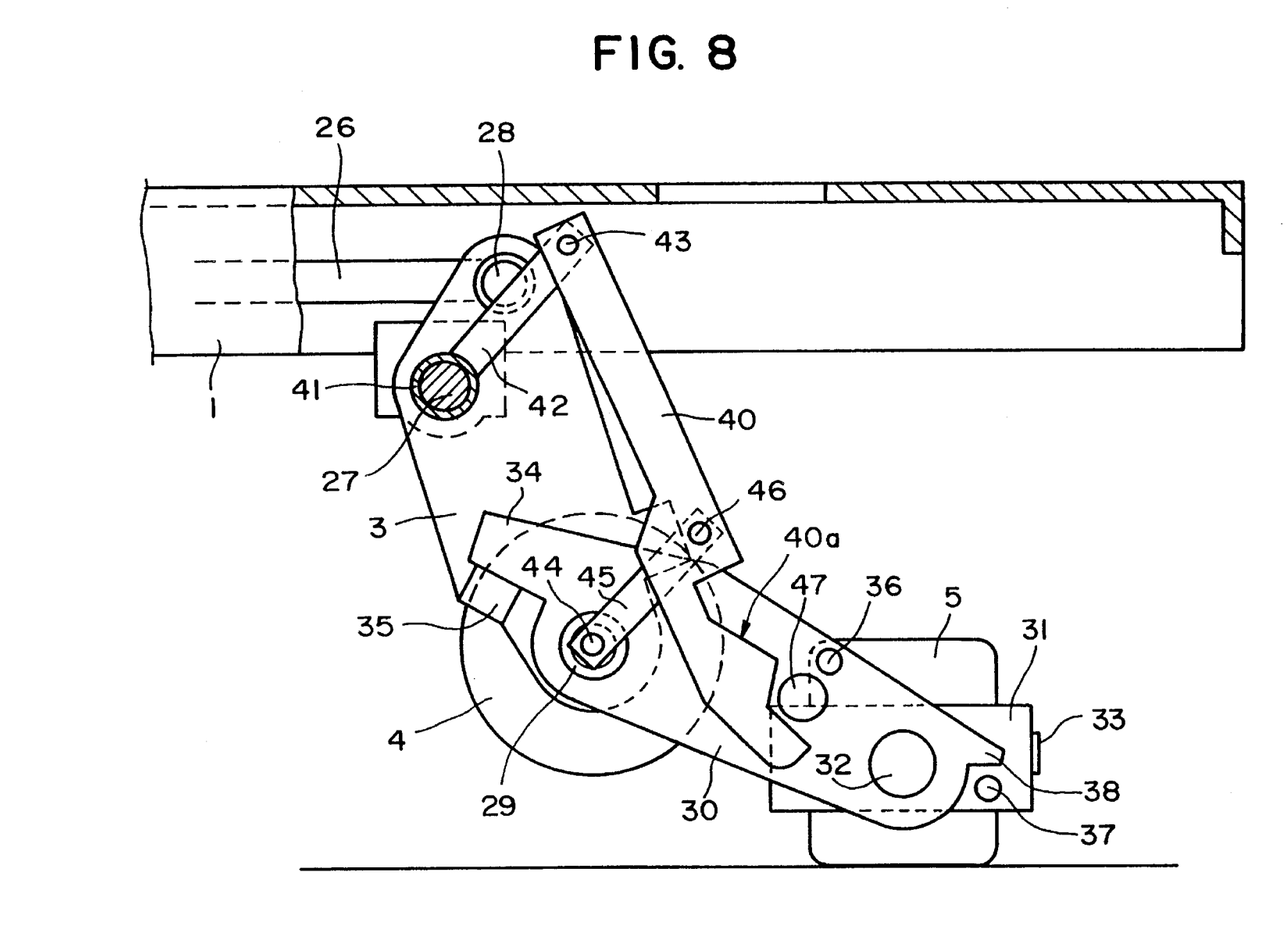
FIG. 8 is an illustration to show how the front part of the bed is raised in the final stage.

As clearly shown in FIGS. 1, 6 and 8, the arms (3, 3) are pivotably fixed to the bed by means of shafts (27, 27) and the connecting rods (26, 26) are connected to the arms with joints (28, 28) above the shafts (27, 27). A pair of bearing arms (30, 30) are rotatably joined to the axis (29) of the wheels (4, 4) for moving the truck backward and forward. A generally square frame (31) in which the wheel (5) for moving the truck right and left is enclosed and rotatably joined to the inside of the square frame by means of joints (33, 33) is joined to the end of the bearing arms (30, 30) respectively by means of joints (32, 32).

A stopper (35) for restricting the movement of the rear end (34) of the bearing arms (30, 30) in a certain range is firmly fixed to the arms (3, 3) in one. Stopper bolts (36, 37) for restricting the rotational movement of the square frame (31) around the joints (32, 32) are fixed to on the bearing arm (30) and the square frame (31) respectively, whereby the stopper bolt (36) of the bearing arm (30) butts against the upper face of the square frame (31) and the stopper bolt (37) of the square frame (31) butts against the front end (38) of the bearing arm (30) and in this way the square (31) frame can rotate around the joints (32, 32) only in a limited range.

Figure 7:
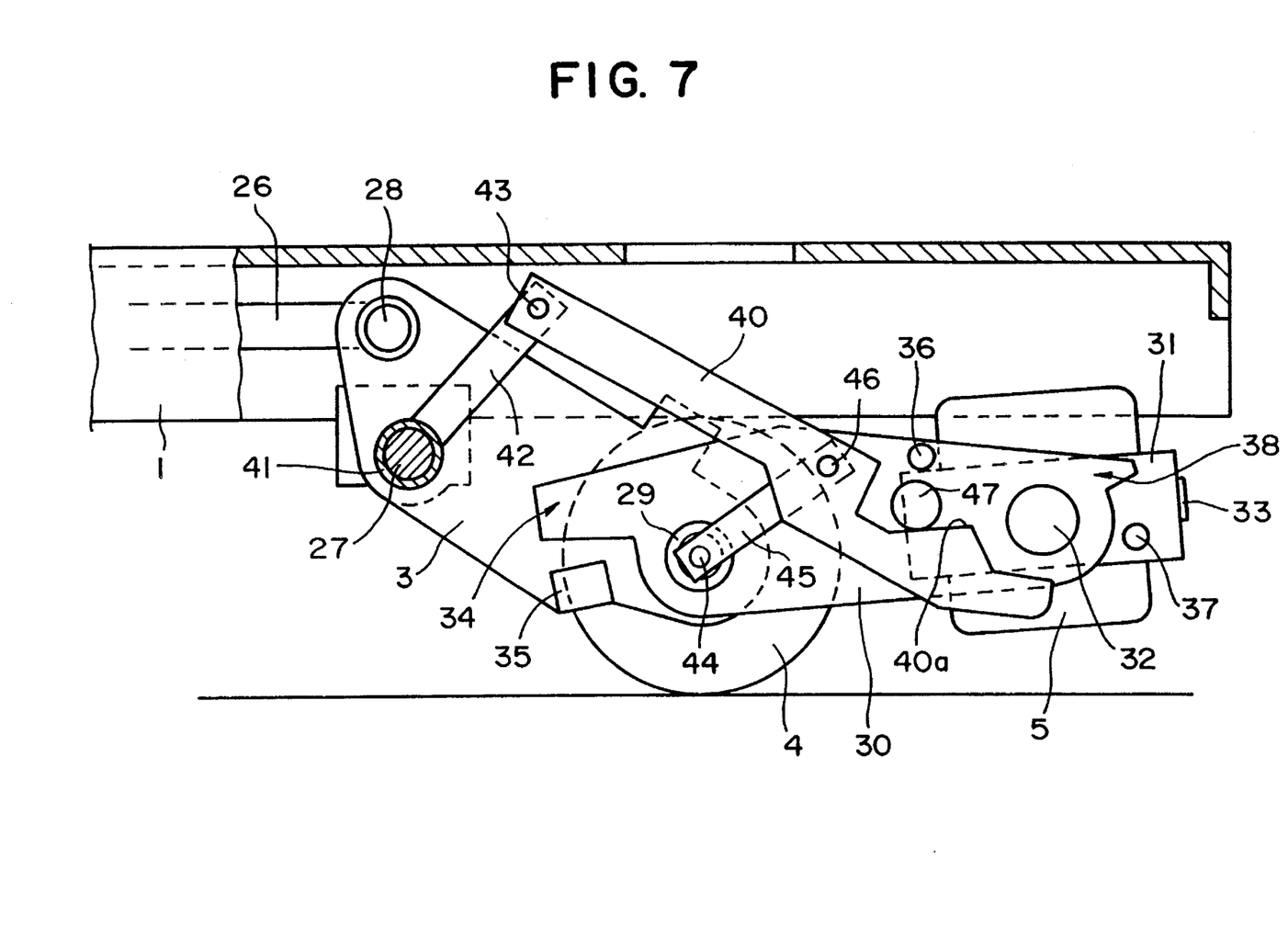
FIG. 7 is an illustration to show how the front part of the bed is raised in the initial stage.

When the T-shaped handle (21) is swiveled backward and forward to work the plunger pump (12), oil in the tank (13) is fed into the ram cylinder (7) and thereby the piston (8) is raised to elevate the bed (1) keeping it in the horizontal position. In this way, cargoes (39) put on the bed of the truck can be carried by pushing or pulling the handle (21). In the initial lifting process of the bed, however, the wheels (4, 4) for moving the truck backward and forward support the bed on the ground as shown in FIG. 7 before the rear end (34) of the bearing arms and the stopper (35) butt against each other. Their butting, however, raises the wheels (4, 4) up from the ground and allows the wheels (5, 5) to touch with the ground and support the bed. At this time, if the rear wheel (10), which is directing to the longitudinal direction, is directed to the lateral direction by turning the handle (21), then the truck can be moved to the lateral direction.

An arm (40) for keeping the wheels (5, 5) up from the ground while the wheels (4, 4) are in touch with the ground is provided to the truck. For this purpose, the lower end of a fulcrum link (42) is joined to a bearing (41) covering the shaft (27) and the upper end thereof is rotatably joined to a pin (43) on the rear end of the arm (40); one end of a swiveling link (45) is fixed to an inside shaft (44) rotatably put in the wheel axis (29) and the other end thereof is rotatably joined to a pin (46) located nearly in the middle of the arm (40); and a cam recess (40a) which is formed on the upper edge of the arm (40) is designed to receive the under face of a bolt (47) fixed to the bearing arm (30). By such mechanism the front part of the bearing arm (30) is prevented from lowering and the wheels (5, 5) are kept in place as high as they can move the truck with the bed raised at a certain height above the ground.

Moreover, as shown in FIGS. 2, 3, 5 and 9, a locking plate (48) and a locking pin (49) are provided to the truck in order to lock the rear wheel (10) after turned to the right or the left by turning the handle (21) according to requirement.

Figure 9:
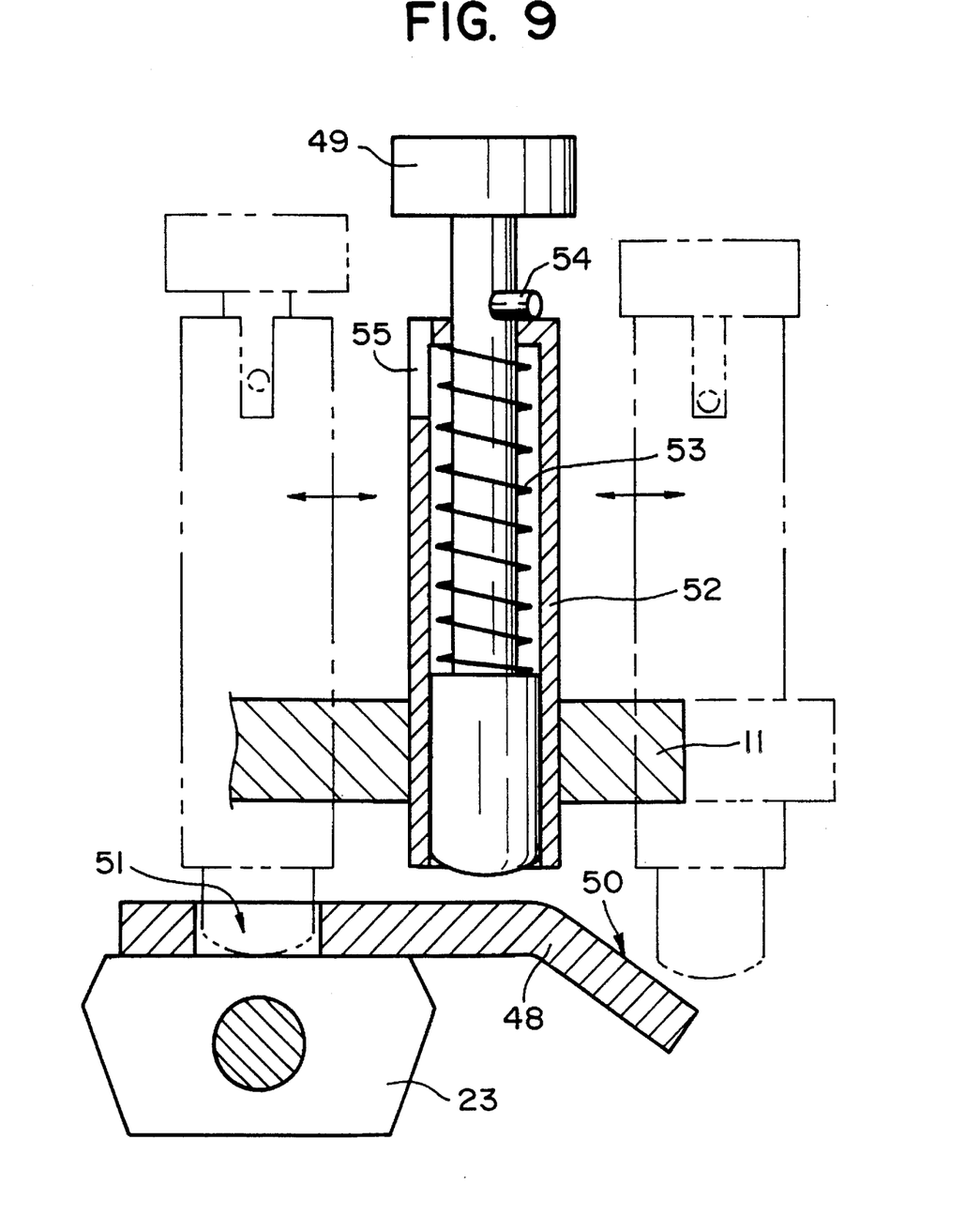
FIG. 9 is an enlarged side view of a locking mechanism of a rear wheel.

A pair of the locking plates (48) are fixed on the bearing plate (23) on both sides of the cylinder (7). A guide surface (50) and locking hole (51) are formed on the locking plates. A cylinder (52) in which the locking pin (49) is put stands upright on the front part of the base (11). A stopper pin (54) is provided under the head of the locking pin put in the cylinder (52) and designed to fall into a kerf (55) by the elastic force of a spring (53) at just the time the lower end of the locking pin is put in the locking hole (51).

As best seen from the above, when the lower end of the locking pin (49) is out of the locking hole (51) with the stopper pin (54) out of the kerf (55), the rear wheel (10) can be rotated freely. But when the stopper pin (54) is put in the kerf (55), the lower end of the locking pin touches with the guide surface (50), then with the locking plate (48) and finally falls into the locking hole (51) by the force of the spring as the pumping handle is turned in such a way as to turn the rear wheels (10, 10). In this way the locked rear wheels (10, 10) can roll in the lateral direction.

As stated above, in the truck of this invention the front wheels (4, 4) which move backward and forward in the longitudinal direction and the front wheels (5, 5) which move right and left in the lateral direction are exchangeable for each other only by swiveling the pumping handle (21) to work the plunger pump and the ram cylinder (7), moreover, the rear wheels (10, 10) can be locked so as to move in the lateral direction by the locking of the locking pin (49) and the hole (51) on the locking plate (48).

In accordance with these features, the truck of this invention can be moved conveniently and safely even in a narrow space such as in a construction site especially when it is loaded with long cargoes (39) by pushing or pulling the handle and/or directly pushing cargoes from their lateral side.

Figure 10:
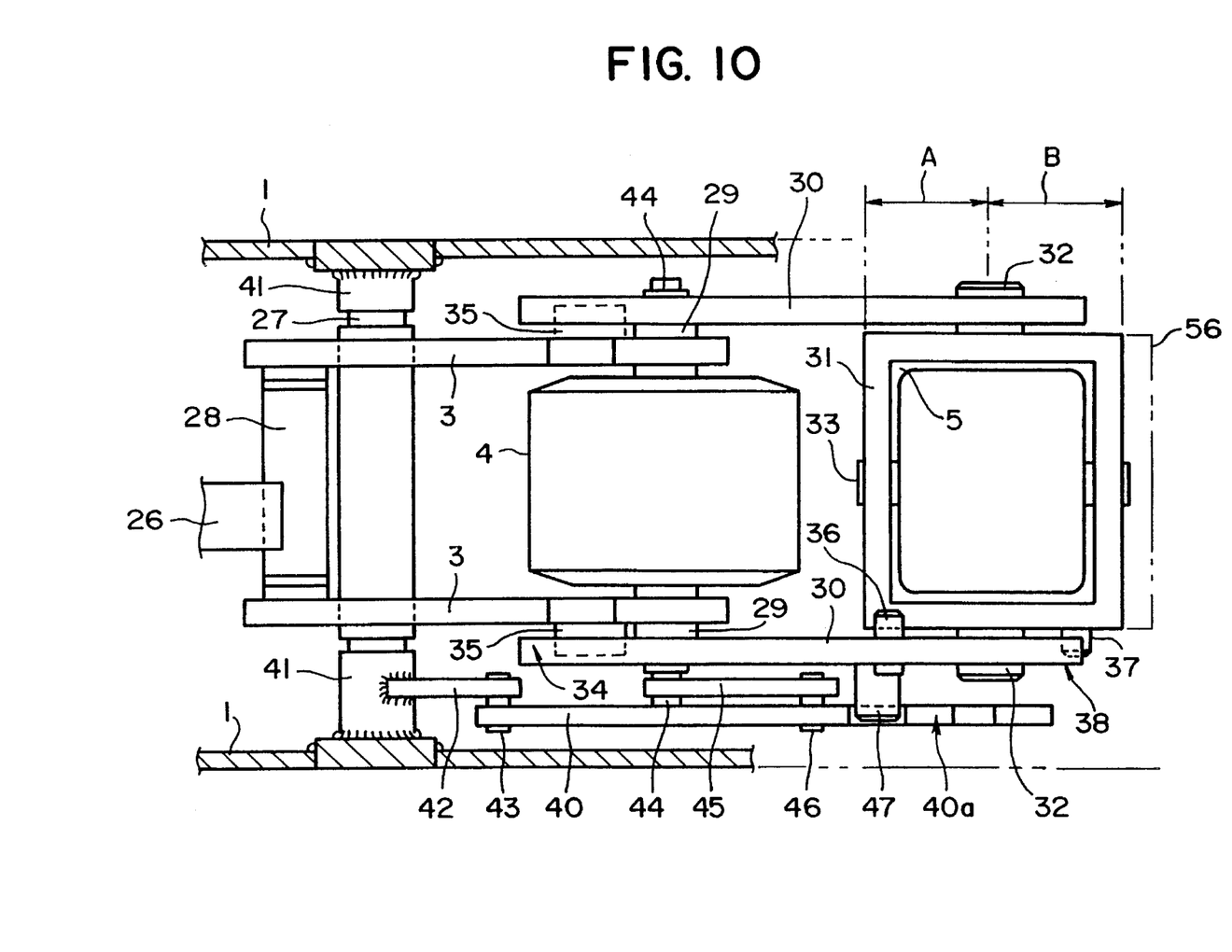
FIG. 10 is a plan of the front part of the bed showing a modified example of a square frame.

Additionally, when the length (B) from the joint center (32) to the front end of the square frame (31) is made greater than the length (A) from the joint center to the rear end of the square frame or any weight (56) is fixed to the front end of the square frame in order to make the front end of the square frame heavier than the rear end thereof, the stopper bolt (36) is always in touch with the upper face of the square frame (31) and thereby the stopper bolt (37) and the front part (38) of the bearing arms (30) can be eliminated to restrict the rotational movement of the square frame (31) around the joint (32).

As seen from the above example, the truck of this invention has wheels (4, 4) that are fixed to the front part of a bed (1) with arms (3, 3) put in between so freely as to move up and down and designed to roll backward and forward in the longitudinal direction when in touch with the ground, wheels (5, 5) that are fixed to said arms (3, 3) with bearing arms (30, 30) put in between so freely as to move up and down and designed to roll right and left in the lateral direction when in touch with the ground, and rear wheels (10, 10) that are fixed to said bed with a hydraulic pressure cylinder put in between and capable of changing its direction by the turning of a pumping handle (21) which works said cylinder (7). And it is characterized in that an arm (40) of which one end is rotatably joined to said bed (1) with a fulcrum link (42) put in between is provided to the inside of said bed and joined to one end of a swiveling arm (45) of which the other end is rotatably joined to one of said arms (3) in order that said wheels (4, 4) can be raised up from the ground by the movement of said arm (40) in association with the rising movement of said bearing arms (30, 30) coupled with the movement of said arms (3, 3) to lower said wheels (5, 5) down on the ground.

As stated above, the arm (40) and the swiveling 1 ink (45) are built in the truck in such a compact form as to be put beside the bed and the ascending movement of the wheels (4, 4) is followed by the descending movement of the wheels (5, 5) in such a smooth manner that the truck of this invention is very durable for long use and can be used with safety even in a very narrow space.

What is claimed is:

1. A truck comprising:

a bed (1) having two spaced apart projecting forks, said forks joined together at a rear part of the bed (2);

said bed supported by a rear wheel (10) and, for each fork, for movement means, wherein said rear wheel and said fork movement means are adapted to upward, downward, longitudinal and lateral movement, said fork movement means is comprised of longitudinal movement means and lateral movement means rotatably coupled together, each of said longitudinal movement means is comprised of a first wheel (4) and each of said lateral movement means are comprised of a second wheel (5), said first wheel (4) is rotatably joined to a pair of arms (3, 3) and rotatably joined to the rear end (34) of a pair of bearing arms (30, 30), the front end (38) of said bearing arms (30, 30) is rotatably joined to a frame (31), and said frame (31) is rotatably joined to said second wheel (5), a stopper (35) for restricting the movement of the rear end (34) of the bearing arms (30, 30) is firmly fixed to the arms (3, 3); and lifting means connected to said rear wheel and said fork movement means.

2. The truck according to claim 1 wherein a connecting rod (26) is connected to the pair of arms (3, 3) by a joint (28).

3. The truck according to claim 1 further comprising locking means in order to lock the rear wheel (10) in place.

4. A truck comprising:

a bed (1) having two spaced apart projecting forks, said forks joined together at a rear part of the bed (2);

said bed supported by a rear wheel (10) and, for each fork, for movement means, wherein said rear wheel and said fork movement means are adapted to upward, downward, longitudinal and lateral movement, said fork movement means is comprised of longitudinal movement means and lateral movement means rotatably coupled together, each of said longitudinal movement means is comprised of a first wheel (4) and each of said lateral movement means are comprised of a second wheel (5), said first wheel (4) is rotatably joined to a pair of arms (3, 3) and rotatably joined to the rear end (34) of a pair of bearing arms (30, 30), the front end (38) of said bearing arms (30, 30) is rotatably joined to a frame (31), and said frame (31) is rotatably joined to wheel (5), stopper bolts (36, 37) for restricting the rotational movement of the frame (31) are fixed on the bearing arm (30) and the frame (31), respectively; and lifting means connected to said rear wheel and said fork movement means.

5. The truck according to claim 4 wherein a connecting rod (26) is connected to the pair of arms (3, 3) by a joint (28).

6. The truck according to claim 4 further comprising locking means in order to lock the rear wheel (10) in place.

* * * * *